Figure 1:
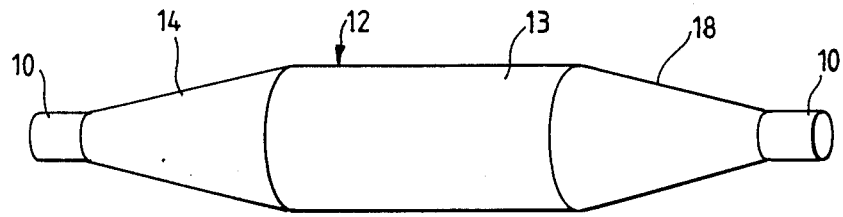

United States Patent [19]

Tanaka

[11] Patent Number: 4,944,143
[45] Date of Patent: Jul. 31, 1990

[54] SPEED CONTROL MEANS AND APPARATUS FOR A REPEATABLE MATERIAL PROCESSING APPARATUS

[76] Inventor: Akira Tanaka, 4-28 Mandai Higashi 3-chome, Sumiyoshi-ku, Osaka, Japan

[21] Appl. No.: 279,949

[22] Filed: Dec. 5, 1988

[30] Foreign Application Priority Data

Dec. 4, 1987 [JP] Japan ................................ 62-308420
Dec. 4, 1987 [JP] Japan ................................ 62-308421

[51] Int. Cl.$^5$ .............................................. D01H 1/26
[52] U.S. Cl. .......................................... 57/93; 57/95; 57/98
[58] Field of Search .............................. 57/93, 94–98; 242/26.4, 27

[56] References Cited

U.S. PATENT DOCUMENTS

| | | | |
|---|---|---|---|
| 3,693,340 | 9/1972 | Kanai et al. ............................... | 57/93 |
| 3,724,197 | 4/1973 | Scowcroft ................................ | 57/93 |
| 4,023,342 | 5/1977 | Schenkel .............................. | 57/93 X |
| 4,254,615 | 3/1981 | Adolf et al. ......................... | 57/93 X |
| 4,336,684 | 6/1982 | Hartmanns et al. ...................... | 57/93 |
| 4,359,858 | 11/1982 | Wolf ...................................... | 57/93 |
| 4,531,353 | 7/1985 | Majette .............................. | 57/98 X |

*Primary Examiner*—Stuart S. Levy
*Assistant Examiner*—Steven M. duBois
*Attorney, Agent, or Firm*—Richard E. Jenkins

[57] ABSTRACT

The invention provides a means of controlling the speed of operation of a material processing apparatus, such as a ring spinning machine in a textile mill. The purpose of the invention is to allow high speed processing, while maintaining a high quality product. In the case of ring spinning for instance, the object is to reduce the incidence of yarn breakages.

The method in accordance with the invention includes controlling the speed of operation during a total time for processing a finite quantity of the material, and including the use of an automatic control apparatus preset to change the speed of the driving motor in a series of very small increments throughout a speed change time which is a predetermined percentage of the total time, between two speeds, one of which is a predetermined optimum operating speed and the other of which is a predetermined percentage of the operating speed. The essence of the invention is the selection of percentages of the operating speed and the total processing time for controlling the point from which the speed change is effected up to the operating speed or down to which the speed change is effected from the operating speed.

5 Claims, 6 Drawing Sheets

SPEED CONTROL MEANS AND APPARATUS FOR A REPEATABLE MATERIAL PROCESSING APPARATUS

In many material processing operations, control of the speed of the operation is of paramount importance, especially where the process is largely automatic and has to be repeatable. Frequently, the obvious desideratum of high speed operation, to obtain high production rates, has to be qualified because merely increasing the speed has some deleterious effect on the process itself.

A particular instance of this is in textile spinning, where a textile yarn issuing from a set of drafting rollers is wound (usually at high speed) on to a spindle—or a yarn holder mounted on the spindle—through the intermediary of a ring and traveller or equivalent device which produces the spinning effect. Purely from the point of view of production rate, the spinning machine should be operated at as high a spindle speed as possible—limited only by the physical characteristics of the machine. However, at very high speeds there is sometimes a loss of quality and the higher the speed, the greater the tendency for the yarn to break. Production rates and yarn quality fall if there are numerous yarn breakages and in any case it is important to obtain good quality yarn which necessitates the choice of an optimum spinning speed. In practice therefore, the limiting speed of operation is obtained by balancing the advantage of high speed against the increasing number of yarn breakages and/or loss of quality and finding an optimum operating speed.

It has also been found that the greatest incidence of yarn breakages occurs during the first part of a spinning process when the yarn package is being built up to its maximum diameter (i.e. building the frusto conical base of the package) and during the last part of the spinning process when the frusto conical top of the yarn package is being produced and the diameter of the package is being reduced from the maximum diameter. The present invention when applied for instance to a textile ring spinning operation, reduces the incidence of yarn breakage and/or permits higher operating speeds.

Although the invention has been conceived in relation to ring spinning, it is to be understood that it is not limited to ring spinning, nor even to textile processes, since in principle, it can be applied to any process where a finite quantity of material is to be processed (for example: paper, chemical products—liquids or powders—extruding of metals and plastics).

According to a first aspect of the invention in a method of controlling the speed of a repeatable material processing operation, during a total time required for processing a finite quantity of the material, a driving motor which at all times determines the process speed is controlled by an automatic control apparatus which is preset to change the speed of the driving motor in a series of very small increments throughout a speed change time which is a predetermined percentage of the total time, between two speeds, one of which is a predetermined optimum operating speed and the other of which is a predetermined percentage of the operating speed.

In one way of carrying out the invention, the other speed is a preset starting speed, lower than the operating speed and the change takes place in advance of the commencement of the operating speed, up from the starting speed to the operating speed. In another way of carrying out the invention, the other speed is a preset finishing speed lower than the operating speed and the change takes place after the termination of the operating speed down from the operating speed to the finishing speed.

According to a preferred form of this aspect of the invention, in a method of controlling the speed of a repeatable material processing operation, during a total time required for processing a finite quantity of the material, a driving motor, which at all times determines the process speed, is controlled by an automatic control apparatus which is preset to:

(i) increase the speed of the driving motor in a series of very small increments throughout a first speed change time which is a predetermined percentage of the total time from a starting speed which is a predetermined percentage of an optimum operating speed up to the operating speed;

(ii) maintain the speed of the driving motor at the operating speed through a constant speed time which is a predetermined percentage of the total time, and, (iii) decrease the speed of the driving motor in a series of very small increments throughout a second speed change time which is a predetermined percentage of the total time from the operating speed down to a finishing speed which is a predetermined percentage of the operating speed.

Preferably the operating speed is maintained for the greater part of the total time. It is further preferred that the increments of speed increase are of equal value.

It will be observed that the invention requires the process to be concerned with a finite quantity of material, so that, in the case of a textile ring spinning operation, the finite quantity is the total length of yarn contained in a full yarn package as produced on the machine spindle. If the invention were applied for instance to a plastics extrusion process, the finite quantity would be the quantity (weight or volume) of material contained in one extruded length. Knowing the finite quantity of material, the total time, which is one of the parameters of the process according to the invention, can be calculated or estimated.

Secondly, the apparatus has to be preset to an operating speed. This is the maximum speed of the operation which is determined with respect to other factors—for instance in the case of the ring spinning process, it will be determined to produce a tolerable number of yarn breakages and the quality of the finished yarn—although use of the invention reduces the yarn breakage rate, so that is a given number of breakages can be tolerated, then the operating speed may be higher than would be the case if the invention were not used.

Thirdly, the apparatus has to be preset to give a speed change time. This will initially be ascertained empirically, but as experience increases, it will be possible to estimate it quite accurately for optimum results. In the case of a ring spinning process, it may be approximately equal to or slightly less than the time taken to build either the base or the top of the yarn package.

Finally, it is necessary to preset a second speed (which will either be a starting speed or a finishing speed) from which or to which the speed change can be made. Again, this speed is arrived at initially by empirical methods.

Once these parameters have been determined and preset, the control apparatus effects the control over the speed change time to produce the incremental increase or decrease of the speed of the driving motor. The speed change thus takes place quite smoothly, rather than abruptly, and this reduces the incidence of yarn breakages.

According to a second aspect of the invention, a repeatable material processing apparatus includes a driving motor which determines the process speed, and a speed control apparatus including an automatic processor which is pre-programmed so that it (i) determines the duration of a speed change time as a preset percentage of a preset total time and, (ii) changes the speed of the driving motor in a series of very small increments throughout a speed change time between two speeds, one of which is a predetermined optimum operating speed and the other of which is a predetermined percentage of the operating speed.

Preferably, the control apparatus includes a microprocessor, and it is further preferred that the motor is an a.c. motor and that speed change is effected by changing the frequency of the electrical supply to the motor.

In one form of this aspect of the invention, the apparatus is a textile spinning frame and the speeds which are subject to a predetermination and change are spindle speeds.

The apparatus is capable of carrying out the method of the first aspect of the invention. In the case of a ring spinning machine, the driving motor determines the speed of the spindles.

One form of apparatus in accordance with the second aspect of the invention and its method of operation in accordance with the first aspect, will now be described by way of example only, with reference to the accompanying drawings, in which:

FIG. 1 is a diagrammatic representation of a yarn package as produced on the spindle of a ring spinning machine (illustrated for convenience in a horizontal position instead of in the vertical position in which it is produced on the machine).

Figure 2:
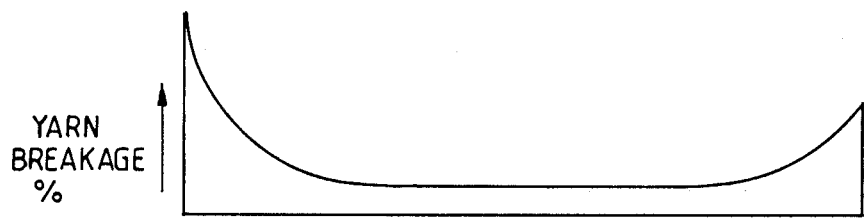
Figure 3:
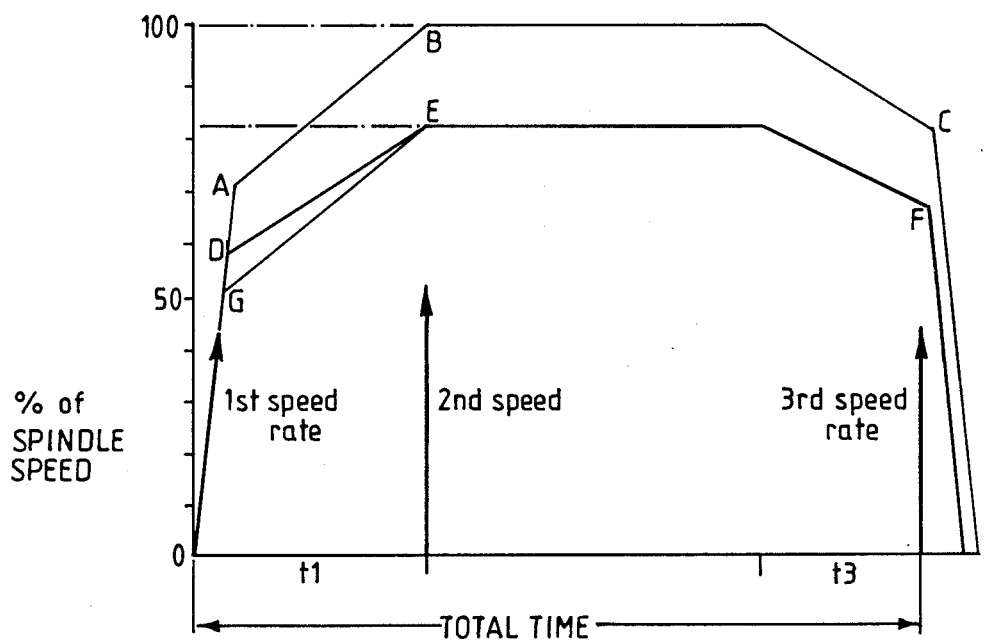
Figure 4:
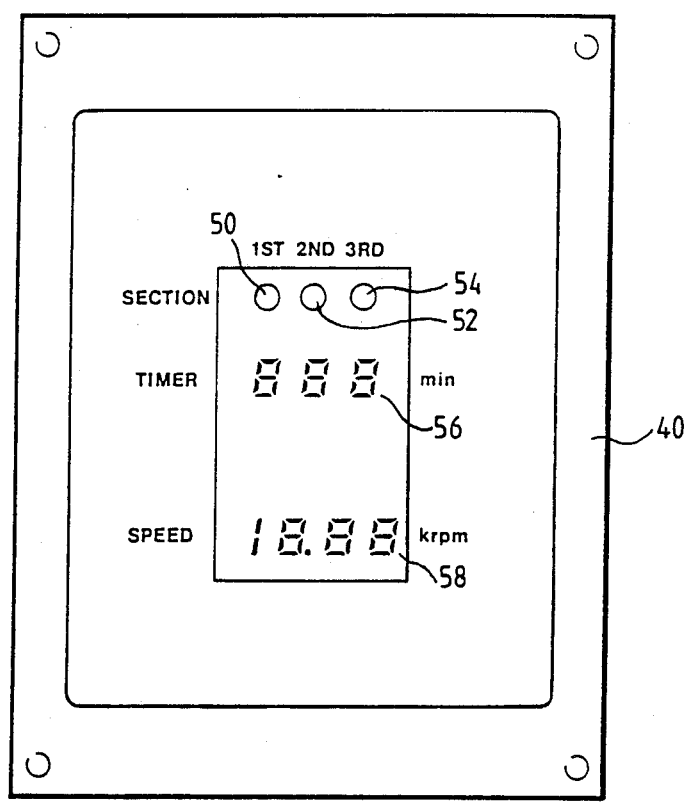
Figure 5:
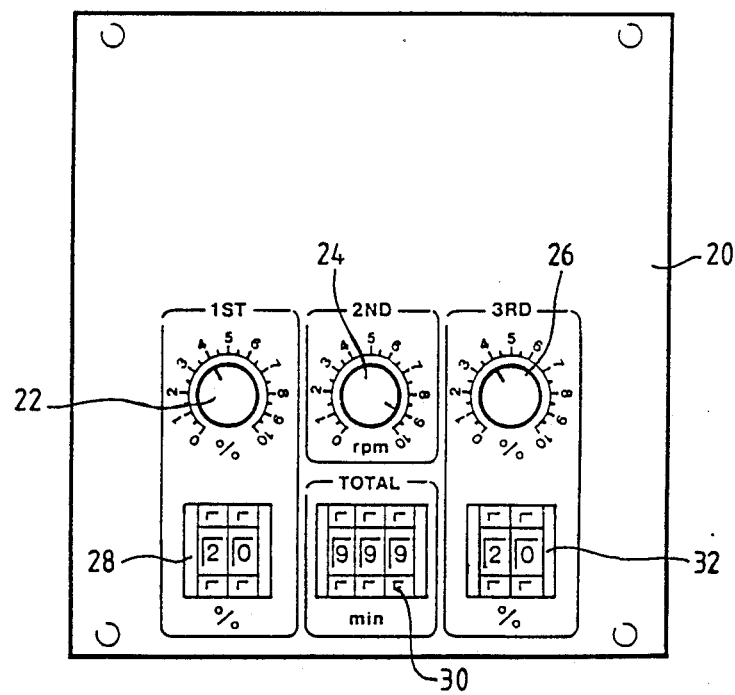
Figure 6:
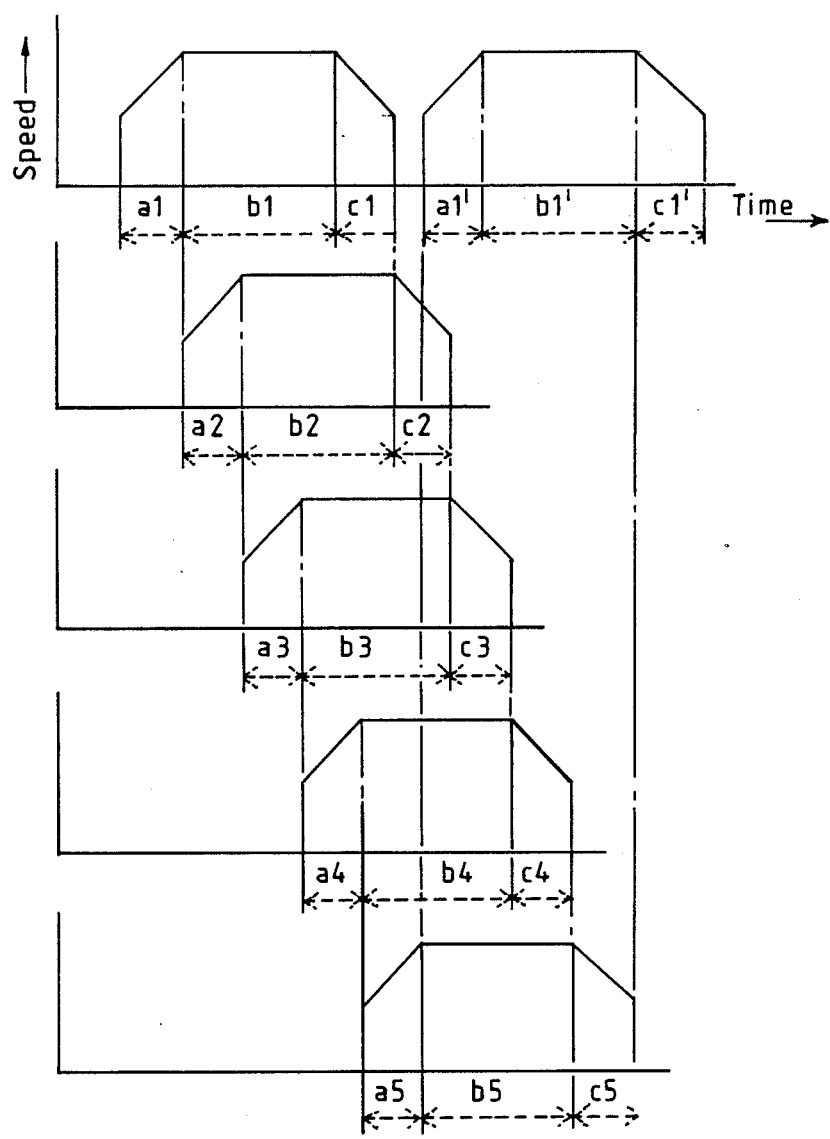
Figure 7:
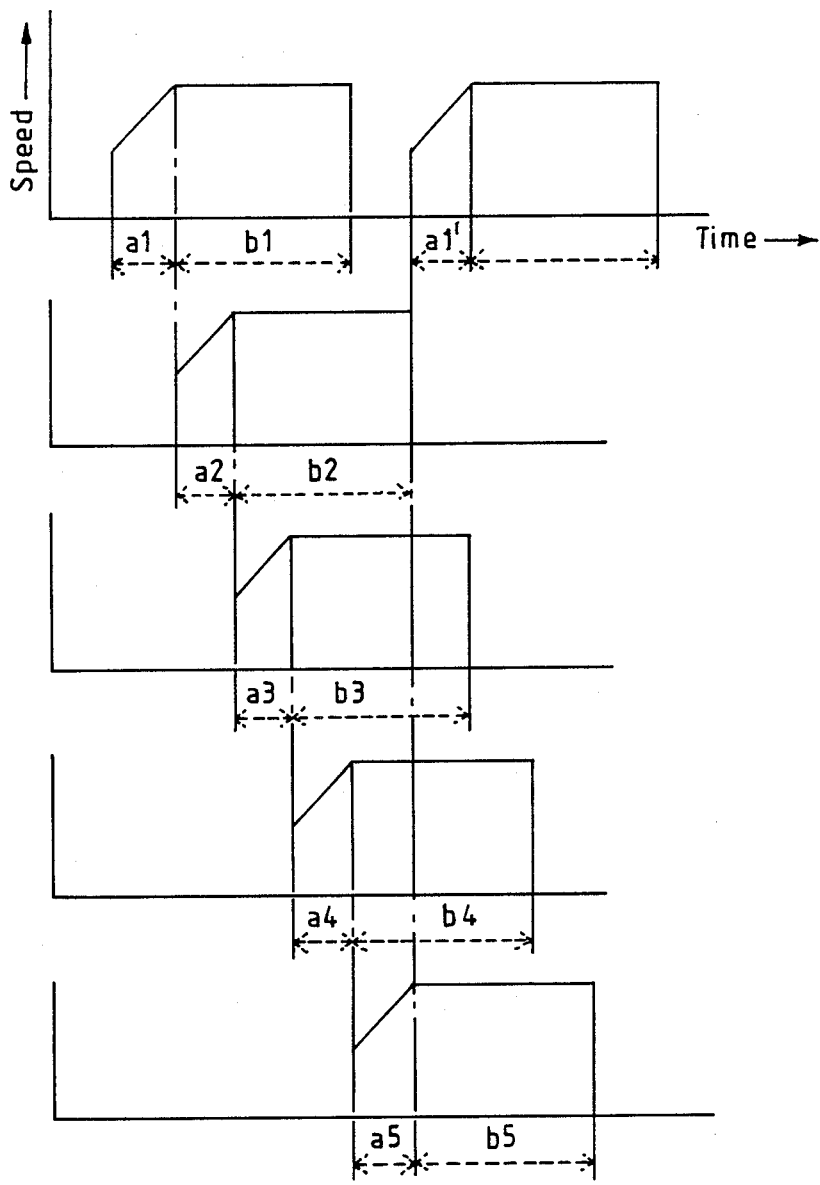
Figure 8:
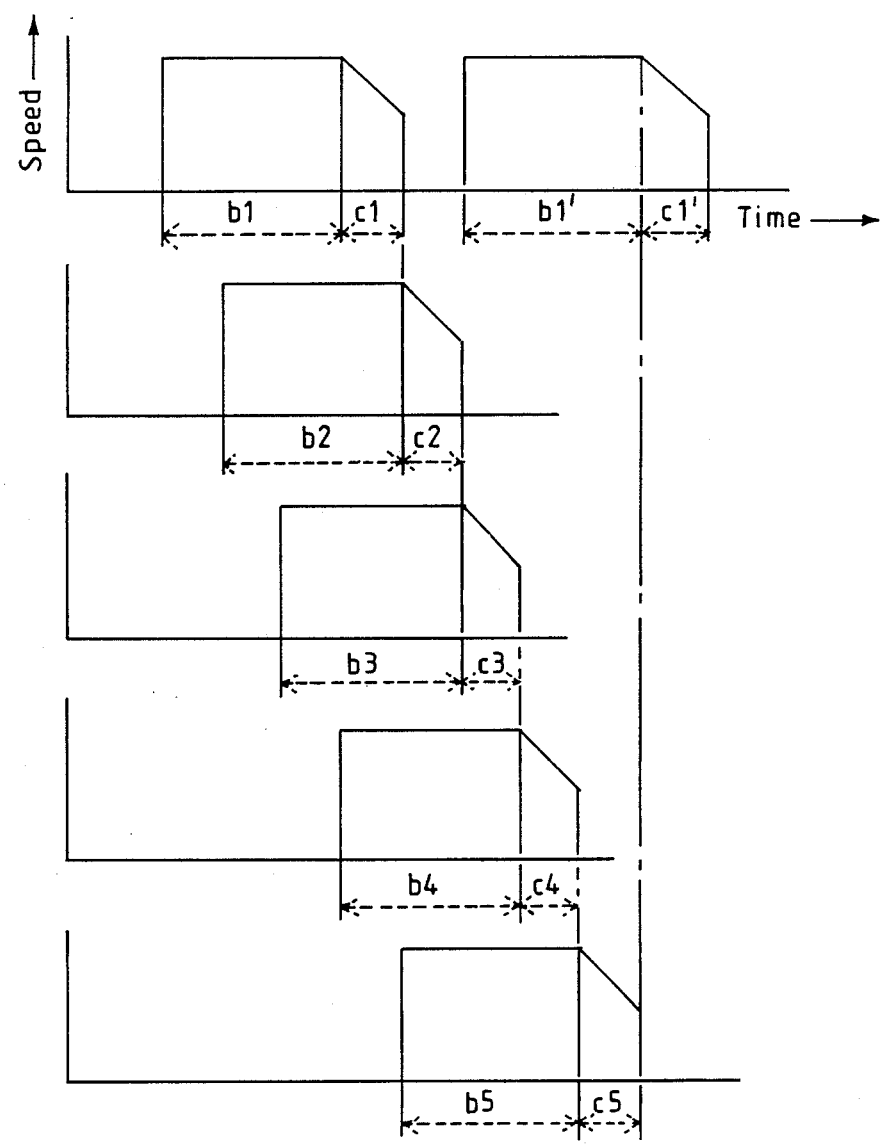

FIG. 2 is a graph of yarn breakages plotted against time, relative to the yarn package shown in FIG. 1, FIG. 3 is a graph of spindle speeds used to produce the package shown in FIG. 1, FIG. 4 is a front view of a display panel on a control box provided on a spinning machine, FIG. 5 is a front view of a control panel on the control box, FIG. 6 is a diagram showing the spindle speeds of a series of five spinning machines, and FIGS. 7 and 8 are diagrams similar to FIG. 6, but showing alternative spindle speed control conditions.

In a textile ring spinning or similar process, a single yarn drawn from the front drafting rollers is wound on to a plastics or paper tube 10 (FIG. 1) which is pressed on to one of the machine spindles for the spinning operation, but removed from the spindle after a spinning operation has been completed. The yarn arrives at the tube 10 via a traveller (not shown) on a ring surrounding the spindle, and the ring rail on which the rings appertaining to all the spindles on one side of the spinning frame are supported, is raised and lowered automatically during the spinning process, so that the yarn package 12 is built up. This yarn package comprises a base portion 14 in the shape of a frustum of a cone; a body 13 in the shape of a cylinder and a top 18 also in the shape of a frustum of a cone. This package shape is quite conventional and is adapted to reduce any tendency of the yarns in the body of the package to fall towards the ends of the tube.

It is customary to operate a ring spinning machine at high speeds, for instance, a spindle speed of up to 15,000 revolutions per minute (R.P.M.). In a conventional ring spinning machine, the driving motor drives the spindles through an endless belt or tape extending along one side of the machine, the whorl of each spindle being pressed against the belt. There may also be change speed gearing or a variable speed gearbox interposed between the motor and the belt or tape. Normally, when the driving motor is switched on, it builds up speed very rapidly (in a matter of a few seconds) to the top speed. However, the linear velocity of the yarn being wound on to the tube 10 varies with the diameter of the yarn package, and is more than twice as fast when the yarn is winding on to the outside of the body 12, as when it is winding directly on to the tube 10.

Referring now to FIG. 2, the percentage of end breakages in a typical spinning operation (i.e. the total time required to complete the winding of the yarn package 12) is plotted against the location of the ring relatively to the tube 10. It will be observed that the peaks are at the ends, that is at the start of the process where the yarn is beginning to build the base 14 and at the end of the process, where it is finishing the top 18. The yarn breakage during the building of the body 12 is relatively low. Because there is a tolerance level for yarn breakages, the operating speed has to be reduced to bring the end peaks of the graph shown in FIG. 2 below the tolerance threshold.

In order to deal with the problem of yarn breakage, particularly during the build of the base and the top, spinning machines are sometimes provided with relatively complicated mechanical speed change devices (necessitating manual changing of gears or pulleys, especially when the yarn count is to be changed) or pole change motors or d.c. motors (which are expensive). The most common arrangement is that using a pole change motor, but generally a pole change motor will only permit two operating speeds with a drastic speed change when the pole change is effected. Such a drastic speed change can itself be the cause of yarn breakages.

The spinning frame is modified in accordance with the present invention by the provision of control apparatus for the driving motor, which is a standard a.c. motor. An inverter is used to control the motor during speed changes, as will hereinafter appear, and a microprocessor also forms part of the control apparatus. The use of a conventional a.c. motor avoids the expensive d.c. motors which have most commonly been used on spinning machines.

As illustrated in FIG. 5, there is a control panel 20 on a box (not shown) housing the motor control gear, and this panel 20 is equipped with three speed setting knobs 22, 24 and 26 which enable motor speed signals to be preselected and fed into the microprocessor. It will be observed from FIG. 5, that the centre speed setting knob 24 reads off in R.P.M. (this will indicate the motor speed not the spindle speed, but of course the spindle speed is directly proportional to the motor speed) whereas the knobs 22 and 26 are set to read off in percentages. The microprocessor is programmed (ROM) so that a percentage setting on one of the knobs 22 and 26 gives an output signal to the motor which will produce a motor speed which is the selected percentage of the speed set on the centre knob 24. Thus if 10,000 R.P.M. is selected on the knob 24 and 70% is selected on the knob 22, then the signal from the knob 24 will give a motor speed of 7,000 R.P.M., but if the knob 24 is then set to a speed of say 12,000 R.P.M., the knob 22 will signal 8,400 R.P.M. (70% of 12,000) without adjustment.

The control panel 20 also includes three digital time setting devices 28, 30 and 32 which can be preset to give three time settings to the microprocessor. The central device 30 is graduated in minutes, but the other two devices 28 and 32 are graduated in percentages, so that the signals given by these devices will always be percentages of the time setting on the central device 30.

Further, the central panel also has a display panel 40 (FIG. 4). On this panel there is a series of three indicator lamps 42, 44 and 46 designated 1st. 2nd. and 3rd; a timer in the form of a light emitting diode (L.E.D.) display to give an indication of a selected time in minutes and a speed indicator, also in the form of an L.E.D. display graduated in 1,000's of R.P.M..

The manner in which the control apparatus is programmed to operate, will be best understood by reference to a specific example of its operation. Supposing it is required to wind the yarn package 12 illustrated in FIG. 1 on the spindle of a ring spinning machine. It will be appreciated, that in practice, a large number of identical yarn packages will be wound at the same time on the spinning machine, but for the purposes of the present description, reference will be made to the single yarn package illustrated at 12.

In the first place, the total time required for building the complete yarn package 12 is either calculated or estimated. The calculation is relatively complex, because of the varying diameter of the yarn package, but an experienced spinner will be able to estimate the total time quite accurately, from a knowledge of the speed at which the spindles can be operated, and the yarn counts. This total time forms the base of the graph shown in FIG. 3, and as a first step in the programming of the machine, the total time is selected on the time selection device 30 shown in FIG. 5.

A maximum operating speed B (FIG. 3) is then selected on the central knob 24 and then a first or starting speed A is selected on the knob 22 as a percentage of the maximum operating speed. Thus, the starting speed A illustrated in FIG. 3 is 70% of the maximum speed B. This starting speed is determined initially by empirical methods, but with experience, a spinner will be able to estimate it quite accurately.

Then a third or finishing speed C is selected on the knob 26, and again this is selected as a percentage of the maximum speed B, and in FIG. 3 it is shown as being approximately 85% of the maximum speed B.

It is then necessary to set the calculated or estimated total time on the device 30, and then a first speed change time t1 is selected as a percentage of the total time on the device 28, and a second speed change time t3 is selected on the device 32 as a percentage of the total time. In relation to the chart shown in FIG. 3, the total time forms the base, and the speed change times t1 and t3 are indicated on the base, the first at the beginning, and the second at the end of the total time.

Before the machine is actually operated, it will sometimes be necessary to reduce the operating speed (that is to say the speed at which the motor will run during the central part of the operation between the speed change times t1 and t3) from the maximum speed B, to some slightly lower practicable operating speed E. Such a speed reduction will usually be made to assure a required quality of product. This speed reduction has the effect of automatically reducing the selected starting speed from the position A to the position D, and of automatically reducing the finishing speed from the position C to the position F. The automatic adjustment of the starting and finishing speed settings is obtained because those settings have been preselected as percentages of the operating speed rather than as absolute speeds.

The first speed change time t1 is selected so as to coincide with the time taken to build the base of the yarn package 12, and similarly, the second speed change time t3 is selected to coincide with the period taken to build the top 18 of the yarn package.

When the machine is started, the microprocessor sends a starting signal to the driving motor, which causes the driving motor to accelerate very rapidly, from zero speed to the starting speed. This is indicated in FIG. 3 by the line which is marked with an arrowhead, from the origin to the speed D. At this position, the microprocessor takes over control of the driving motor, and by giving a series of impulses, it changes the supply frequency and causes the motor speed to increase by a series of equal value steps over the remainder of the first speed change period t1 up to the operating speed E. It is this incremental increase of the motor speed during the period of build-up of the base portion 14 of the yarn package, which greatly reduces the incidence of yarn breakage, and which yields the principle advantage of the invention.

When the motor reaches the operating speed E the inverter is cut out, and the motor is changed to a constant speed operation phase at the operating speed E, which is chosen as the optimum speed for the spinning operation.

When the package body 13 has been completed, the microprocessor again takes control of the driving motor, and begins to cause the motor to decrease its speed in a large number of small incremental steps, during the second speed change period t3, from the operating speed E, down to the finishing speed F. Again, because this produces a gradual change of speed of the driving motor, it has been found that there is a considerable reduction in the incidence of yarn breakage. Once the finishing speed F is achieved, the microprocessor switches off the driving motor, and this causes the spindle speed to reduce very rapidly from the speed F to zero.

The foregoing description of the operation of the machine, and in particular, the control of the driving motor indicates how the control apparatus has to be programmed to achieve the required control on the driving motor. It will be appreciated however, that once the parameters have been preselected, if it is required for example to increase the operating speed, this can be done simply by adjusting the settings of the total time device 30, and the operating speed knob 24. This is because the times t1 and t3 are preset as percentages of the total time, and similarly, the starting speed D and the finishing speed F are preset as percentages of the operating speed E.

It is to be understood that the spinning frame may still have change speed gears, variable ratio pulleys or similar mechanical arrangements, but these would only be used for major speed changes, for instance when changing to an entirely different yarn count. Moreover, if mechanical changes are made it will only be necessary to adjust the operating speed knob 24 to give the new operating speed because the other changes will follow automatically from the presetting of the knobs 22 and 26 to percentages of the operating speeds. It might also be necessary to alter the total time setting on the time setting device 30, but the times t1 and t2 will not normally have to be altered because they are percentages of the total time. However, unless there is a large change in the yarn which is being produced it will be possible to effect any necessary changes simply by altering the setting of the knob 24 and the device 30.

Another advantage of the invention over the use of a pole change motor is that the starting and finishing speeds can be much higher without producing too many yarn breakages.

In FIG. 4, there is illustrated a display panel which is also provided on the control gear box. This display panel includes a series of three lamps 50, 52 and 54. The electrical controls are such, that during the period t1, the lamp 50 is illuminated, the lamp 52 is illuminated during the period of operating speed actuation, during the building of the body 13 of the yarn package, and the lamp 54 is illuminated during the decelerating period t3.

The display panel also includes a timer 56, which is shown as a three digit seven bar L.E.D. display, and the timer indicates the total time selected on the device 30. There is also a speed indicator 58 which also comprises a four digit seven bar L.E.D. display graduated in 1,000's R.P.M., and giving an indication of the operating speed selected by the knob 24.

In a spinning mill, there may be a number of spinning frames, and FIG. 6 illustrates how a series of five such spinning frames could be controlled, from a single control apparatus of the kind which has just been described, providing there is also a phase shifting arrangement, whereby the control settings can be applied to each of the spinning frames in turn, utilising the phase shifting arrangement.

Thus, at the top of FIG. 6, there is illustrated the speed chart equivalent to the chart shown in FIG. 3, for two successive spinning operations (i.e. building of two yarn packages) on a first spinning frame. There is a first speed change time a1 followed by an operating time b1 followed by a second speed change time c1. Then there is a time delay, after which the process is repeated for a second yarn package with the times a1$^i$ b1$^1$ and c1$^i$. At a next lower position, there is illustrated the speed chart of a second spinning frame, which is phase shifted relatively to the first spinning frame, so that its first speed change period a2 commences at the completion of the period a1, and its second speed change period c2 overlaps the commencement of the speed change period a1$^i$ of the first spinning frame. Then there are illustrated the speed charts of further spinning frames 3, 4 and 5, in each case, the start of the speed change period coinciding with the termination of the equivalent speed change period on the preceding spinning frame.

In FIG. 7, there is illustrated the speed charts equivalent to the charts shown in FIG. 6, for a set of spinning frames, wherein there is no second speed change time. This is because in some instances, it may be found adequate to have the stepwise control over the speed of the driving motor only during the first part of the build of the yarn package when the speed of the motor has to be increasing. With such an arrangement, the operating speed then continues to the end of the total time period, as indicated at b1, b2, b3, b4 and b5. Conversely, in FIG. 8, there is shown another arrangement of five spinning frames, wherein the speed charts are illustrated, but in which the incremental control over the speed of the driving motor is only exercised during the building of the top portion of the yarn package and not at the commencement of the building of the yarn package.

I claim:

1. A repeatable finite quantity material processing apparatus which includes a driving motor which determines the process speed and a speed control apparatus including:

first preselecting means for preselecting an optimum operating speed (B) of the driving motor;

second preselecting means for preselecting a starting speed (A) as a preselected percentage of the optimum operating speed (B);

third preselecting means for preselecting a total time period (T) for the completion of the finite quantity process;

fourth preselecting means for preselecting a speed change time period (a1) for the change from the starting speed (A) to the operating speed (B) as a preselected percentage of the total time period (T); and an automatic processor for receiving signals from the four preselecting means and arranged to change the speed of the driving motor between the starting speed and the operating speed in a series of very small increments during the preselected speed change time period.

2. A repeatable finite quantity material processing apparatus which includes a driving motor which determines the process speed and a speed control apparatus including:

first preselecting means for preselecting an optimum operating speed (B) of the driving motor;

fifth preselecting means for preselecting a finishing speed (C) as a preselected percentage of the optimum operating speed (B);

third preselecting means for preselecting a total time period (T) for the completion of the finite quantity process;

sixth preselecting means for preselecting a speed change time period (c1) for the change from the optimum operating speed (B) to the finishing speed (C) as a preselected percentage of the total time period (T); and an automatic processor receiving signals from said first, fifth, third and sixth preselecting means and arranged to change the speed of the driving motor between the operating speed and the finishing speed in a series of very small increments during the preselected speed change time period.

3. A repeatable material processing apparatus as claimed in claim 1, or claim 2, in which the driving motor is an a.c. motor and the control apparatus includes a microprocessor.

4. A repeatable finite quantity material processing apparatus as claimed in claim 3, in which the microprocessor comprises means to issue a series of pulses during the speed change time period to change the supply frequency to the driving motor in a series of equal value small steps up or down, thereby to increase or decrease the motor speed up to or down from the optimum operating speed.

5. A repeatable material processing apparatus as claimed in claim 1 or claim 2, in which the apparatus is a textile spinning frame and the speeds which are subject to predetermination and change are spindle speeds.

* * * * *